United States Patent
Simha

(10) Patent No.: US 12,556,235 B2
(45) Date of Patent: Feb. 17, 2026

(54) METHODS AND DEVICES OF PACKET DETECTION FOR MIMO SYSTEMS

(71) Applicant: Morse Micro Pty. Ltd., Surry Hills (AU)

(72) Inventor: Vinay Simha, Surry Hills (AU)

(73) Assignee: Morse Micro Pty. Ltd., Surry Hills (AU)

( * ) Notice: Subject to any disclaimer, the term of this patent is extended or adjusted under 35 U.S.C. 154(b) by 0 days.

(21) Appl. No.: 18/774,840

(22) Filed: Jul. 16, 2024

(65) Prior Publication Data
US 2026/0025170 A1      Jan. 22, 2026

(51) Int. Cl.
H04B 7/0413    (2017.01)
H04L 5/00      (2006.01)
H04L 27/26     (2006.01)
H04W 52/12     (2009.01)

(52) U.S. Cl.
CPC ......... *H04B 7/0413* (2013.01); *H04L 5/0003* (2013.01); *H04L 27/2695* (2013.01); *H04W 52/12* (2013.01)

(58) Field of Classification Search
CPC . H04B 7/0413; H04L 5/0003; H04L 27/2695; H04W 52/012
See application file for complete search history.

(56) References Cited

U.S. PATENT DOCUMENTS

2020/0136250 A1 *    4/2020    Cohen ................. G01S 7/03

\* cited by examiner

*Primary Examiner* — Rahel Guarino
(74) *Attorney, Agent, or Firm* — Polsinelli PC

(57) ABSTRACT

Methods and wireless communication devices for MIMO packet detection, include receiving input data by a receiver, performing peak detection by a two-tiered approach including an outer loop and an inner loop to generate candidates composing of detected peaks from correlation outputs, and driving final start of packet and carrier frequency offset measurements from the candidates as a final packet detection result. The outer loop iterates on (Rx, STS) combination pairs, and the inner loop runs peak detection on the input data by one or more correlators for each of the (Rx, STS) combination pairs. Rx is one of the receiving antennas of the receiver and STS is one of space-time streams received by the receiver. In some embodiments, one or more winning candidates are selected from the candidates based on a score computed from information related to the detected peaks for each candidate, and the final packet detection result is derived from the winning candidates.

20 Claims, 6 Drawing Sheets

| Correlator Parameters | | | | |
|---|---|---|---|---|
| Name | XTF | STF | LTF1 | LTF2 |
| Kernel Length (us) | L | 8 | 16 | 32 |
| Distance between peaks (us) | D | 8 | 32 | 32 |
| Number of peaks (Bandwidth >1) | N | 10 | 3 | 2 |
| Number of peaks (Bandwidth =1) | N | 20 | 5 | 4 |

METHODS AND DEVICES OF PACKET DETECTION FOR MIMO SYSTEMS

FIELD OF THE INVENTION

The present disclosure generally relates to wireless communications. Specifically, aspects of the present disclosure are related to receiving wireless signals with Multiple Input Multiple Output (MIMO) technology.

BACKGROUND

A wireless communication system, for example, an IEEE 802.11 Wi-Fi network, typically includes an Access Point (AP) communicating with one or more Stations (STAs). The AP of the wireless communication system may be coupled to a network, such as the Internet, and may enable STAs to communicate bi-directionally or enable a STA to communicate with other devices coupled to the AP. The development of Multiple Input Multiple Output (MIMO) technology in the wireless communication system led to a significant improvement in basic aspects of the user experience of a wireless network including higher speed, greater capacity, and better stability. MIMO technology improves the coverage and quality of wireless networks by employing multiple transmitting antennas and multiple receiving antennas to exploit multipath propagation. Each of the transmitting antennas is a physical or logical antenna used to transmit one signal or stream and each of the receiving antennas is a physical or logical antenna used to receive one signal or stream. An $N_{tx} * N_{rx}$ MIMO wireless communication system has $N_{tx}$ transmitting antennas and $N_{rx}$ receiving antennas, and a transmitter sends multiple streams by the $N_{tx}$ transmitting antennas. These transmit streams go through a matrix channel which consists of all $N_{tx} * N_{rx}$ paths between the $N_{tx}$ transmitting antennas at the transmitter and $N_{rx}$ receiving antennas at the receiver. The receiver receives and decodes the received signal vectors. At the receiver side, designing a reliable and energy efficient MIMO detector is a very challenging task due to the possible interference between the parallel streams, which would require high complexity of signal detection. The objective of signal detection is to find the most probable transmitted symbols based on the perfect Channel State Information (CSI) available at the receiver and the received signal. Optimal massive detectors such as the Maximum Likelihood Detection (MLD) or Sphere Decoding (SD) are infeasible as the computational complexity of these detectors is extremely high. A low computational complexity algorithm achieving near-optimal performance is therefore desired for signal detection in MIMO wireless communication systems. Some existing low computational complexity detection algorithms such as Zero Forcing (ZF), Minimum Mean-Square Error (MMSE), and Successive Interference Cancelation (SIC) may be used in MIMO detection without compromising the performance by too much.

Spatial multiplexing allows an $N_{tx} * N_{rx}$ MIMO system to transmit independent data streams simultaneously. Data streams, also referred to as Space-Time Streams (STSs), are transmitted at the same time and at the same frequency band, and the receiver relies on spatial degrees of freedom to distinguish the streams. In the $N_{tx} * N_{rx}$ configuration, the maximum number of space-time streams $N_{sts}$ is limited by the lesser of either $N_{tx}$ or $N_{rx}$, that is $N_{sts}=\min(N_{tx}, N_{rx})$. The process of sending multiple signals across multiple Transmitting (Tx) antennas is called Tx Beamforming or Spatial Mapping. As a special case, if those signals consist of multiple independent data streams (STSs), it is further qualified as Tx Beamforming with Spatial Multiplexing. Similarly, on the receiver, if there are multiple receiving antennas, the inverse operation called Receiving (Rx) Beamforming or Spatial DeMapping is performed. If the signal has more than one STS, the receiver is referred to by further qualification as Rx Beamforming with Spatial Demultiplexing.

A linear input-output MIMO system can be modelled as a linear equation, $y=Hx+w$, where y and x are the receive and transmit vectors respectively, and H and w are the channel matrix and noise vector respectively. The start of a wireless frame contains a preamble field, which is composed of training sequences. These training sequences are used to detect the start of the packet and relative frequency offset, in a process referred to as packet detection. Following the packet detection process, the receiver estimates a channel response and decodes the DATA field in the wireless frame using a cascade of different operations such as Equalizer, Demapper, and Forward Error Correction (FEC) Decoder.

There are three types of wireless frames according to the IEEE 802.11ah standard, each with a specific packet format. These formats include a S1G_SHORT format, S1G_LONG format, and S1G_1M format. For case of illustration, the S1G_SHORT format is used as the example in the following description. The preamble field of a wireless frame contains Short Training Field (STF) and Long Training Field (LTF), which is used for time and frequency synchronization. STF consists of a very specific and unique waveform which are very easy to detect, and it is used to set the Automatic Gain Control (AGC) optimally, for each of the Rx paths, in such a way that the DATA field is received between the quantization and saturation regions, over a wide dynamic range. LTF is further used to estimate the channel frequency response, which is referred to the $N_{rx} * N_{sts}$ matrix at every sub-carrier. The receiver uses LTF for more accurate frequency offset estimation and time synchronization. The accuracy of the estimated channel frequency response is essential for subsequent decoding of the DATA field. This requires STF and LTF to be beamformed in the same way as the DATA field, because of which, multiple copies of STF and LTF are transmitted at different complex amplitudes, as imparted by spatial mapping coefficients $Q_k$ and cyclic shifts $T_{CS}(m)$ for each space-time stream m. These multiple copies of STF and LTF are measured as multiple sets of distinct correlation peaks at a receiver packet detection module. The cyclic shift diversity values correspond to the space-time streams are predefined in the IEEE 802.11ah standard for each packet format.

In the MIMO receiver, an STF signal still has a strong correlation with a spatially mapped and cyclically shifted STF signal, albeit at a different time-delay. It is also true for the LTF signal. It is critical for the MIMO receiver to resolve the ambiguity between the signal and noise, as well as the ambiguity between the signal and the delayed or scaled version of the signal.

SUMMARY

The following summary presents technical features relating to one or more aspects disclosed herein and should not be considered as an extensive overview relating to all contemplated aspects, nor should the following summary be considered to identify key or critical elements relating to all contemplated aspects or to delineate the scope associated with any aspect. Accordingly, the following summary has the sole purpose to present certain concepts relating to one or more aspects relating to the algorithms disclosed herein in a simplified form to precede the detailed description presented below.

Disclosed are methods and wireless communication devices for processing wireless signals by a MIMO system. According to at least one illustrative example, a MIMO packet detection method is provided. Some embodiments of the MIMO packet detection method include receiving input data by a receiver, performing peak detection by a two-tiered approach including an outer loop and an inner loop to generate multiple candidates, deriving a final start of packet (TO) measurement and a final Carrier Frequency Offset (CFO) measurement from the candidate as a final packet detection result. The MIMO system includes $N_{tx}$ transmitting antennas and $N_{rx}$ receiving antennas, and the number of transmitting antennas $N_{tx}$ and the number of receiving antennas $N_{rx}$ are integers greater than or equal to 1. The outer loop iterates on (Rx, STS) combination pairs, and the inner loop runs peak detection on the input data by one or more correlators for each of the (Rx, STS) combination pairs. Rx is one of the receiving antennas, STS is one of space-time streams received by the receiver, and each candidate is composed of detected peaks from correlation output corresponding to one of the (Rx, STS) combination.

In some embodiments, a number of space-time stream $N_{STS}$ received by the receiver is limited by a minimum value of the number of transmitting antennas $N_{tx}$ and the number of receiving antennas $N_{rx}$, and the number of (Rx, STS) combination is limited by a product of the number of receiving antennas $N_{rx}$ and the number of space-time streams $N_{STS}$. Some embodiments of the inner loop run Short Training Field (STF) detection followed by Long Training Field (LTF) detection, where STF detection includes performing cross-correlation on the input data with at least one STF correlator and LTF detection includes performing cross-correlation on the input data with at least one LTF correlator. For example, one STF correlator with a kernel length equals to 8 microseconds, one LTF correlator with a kernel length equals to 16 microseconds, and another LTF correlator with a kernel length equals to 32 microseconds are used for peak detection. In one embodiment, the step of performing peak detection further comprises deciding between two hypotheses, determining a model for the MIMO system based on the decided hypothesis, determining a metric representing a correlator output power that has a distinct Probability Density Function (PDF) corresponding to the decided hypothesis, making peak decisions by comparing the metric to a threshold, storing peaks, and determining a full set of peaks from the stored peaks as the candidate for the (Rx, STS) combination pair. For example, one hypothesis is an input window aligning with a STF or LTF start, and another hypothesis is the input window not aligning with the STF or LTF start.

In some embodiments of the peak detection, a first threshold is set to compares correlation outputs at the start of packet detection, and then a second threshold higher than the first threshold is used for peak detection to reduce false peak detection. For example, the first threshold corresponds to a predefined multiple of an Additive White Gaussian Noise (AWGN), and the second threshold corresponds to a predefined multiple of a previous maximum peak detected using the first threshold, where the predefined multiple is between 0 and 1.

Some embodiments of the method may further comprise validating the candidates for checking each of the candidates with a criterion, and shortlisting or removing the candidate when the criterion is not satisfied. In one embodiment, the criterion is satisfied when a number of detected peaks in the candidate matches an expected count. In another embodiment, the criterion is satisfied when the detected peaks in the candidate are spaced at an expected inter-peak distance from one another. In yet another embodiment, the method further derives and compares TO and CFO measurements for STF detection and LTF detection, and the criterion is satisfied when one or both TO measurements and CFO measurements between STF detection and LTF detection are matched.

Some embodiments of the packet detection method further select one or more winning candidates from the candidates by computing a score for each candidate and selecting the winning candidate(s) according to the scores. The score of each candidate is derived from information related to the detected peaks of the candidate. An embodiment of the information related to each of the detected peaks includes Inphase (I) and Quadrature (Q) amplitudes, a Cross Correlation Function Power (CCFP), and a location index, and the score of each candidate is derived from one or more metrics or dimensions associated with the information related to the detected peaks of the candidate. For example, the metrics include one or a combination of a mean CCFP of the correlator, a maximum CCFP of the correlator, a variation of CCFP of the correlator, a discrepancy in CFO measurements between last two detected peaks, and a discrepancy in CFO measurements between the detected peaks of two correlators, where the variation of CCFP is computed by subtracting a minimum CCFP from a maximum CCFP. In some embodiments, each metric has a corresponding metric weighting, the score for each candidate is computed according to a sum of the weighted metrics.

In one embodiment, the step of deriving final TO and CFO measurements further includes computing TO and CFO measurements for the candidates, clustering the TO measurements of the candidates with predefined spaces from one another, selecting a TO cluster and corresponding CFO measurements for deriving the final TO and CFO measurements. The TO cluster is selected based on one or more criteria including selecting a cluster that has a maximum number of TO measurements, selecting a cluster that has a maximum cumulative score corresponding to TO measurements containing in the cluster. For example, the final TO measurement is computed by averaging the TO measurements within the selected TO cluster and the final CFO measurement is computed by averaging the corresponding CFO measurements. In another embodiment, the CFO measurements of the candidates are clustered, and a CFO cluster is selected based on one or more criteria including selecting a cluster that has a maximum number of CFO measurements and selecting a cluster that has a maximum cumulative score corresponding to CFO measurements contained in the cluster. A final TO and CFO measurements are derived based on the CFO cluster and corresponding TO measurements. For example, the final CFO measurement is computed by averaging the CFO measurements within the selected CFO cluster and the final TO measurement is computed by averaging the corresponding TO measurements.

In an aspect of the present invention, a wireless communication device for receiving wireless signals by a MIMO system is provided. The wireless communication device includes a receiver, a processor communicatively coupled with the receiver, and one or more memory banks communicatively coupled to the processor and storing process readable codes. The wireless communication device is configured for receiving input data by the receiver, performing peak detection by a two-tiered approach including an outer loop and an inner loop to generate multiple candidates, and deriving a final start of packet measurement and a final carrier frequency offset measurement from the candidates as a final packet detection result. The outer loop iterates on (Rx, STS) combination pairs, and the inner loop runs peak detection on the input data by one or more correlators for each of the combination pairs, wherein Rx is one of the receiving antennas, STS is one of space-time streams received by the receiver, and each candidate is composed of detected peaks from correlation outputs corresponding to one of the combination pairs.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following drawing figures.

DETAILED DESCRIPTION

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive. The following description of the embodiments will provide those skilled in the art with an enabling description for implementing an example aspect. Changes may be made in the function and arrangement of elements without departing from the spirit and scope of the application as set forth in the claims.

Figure 1A:
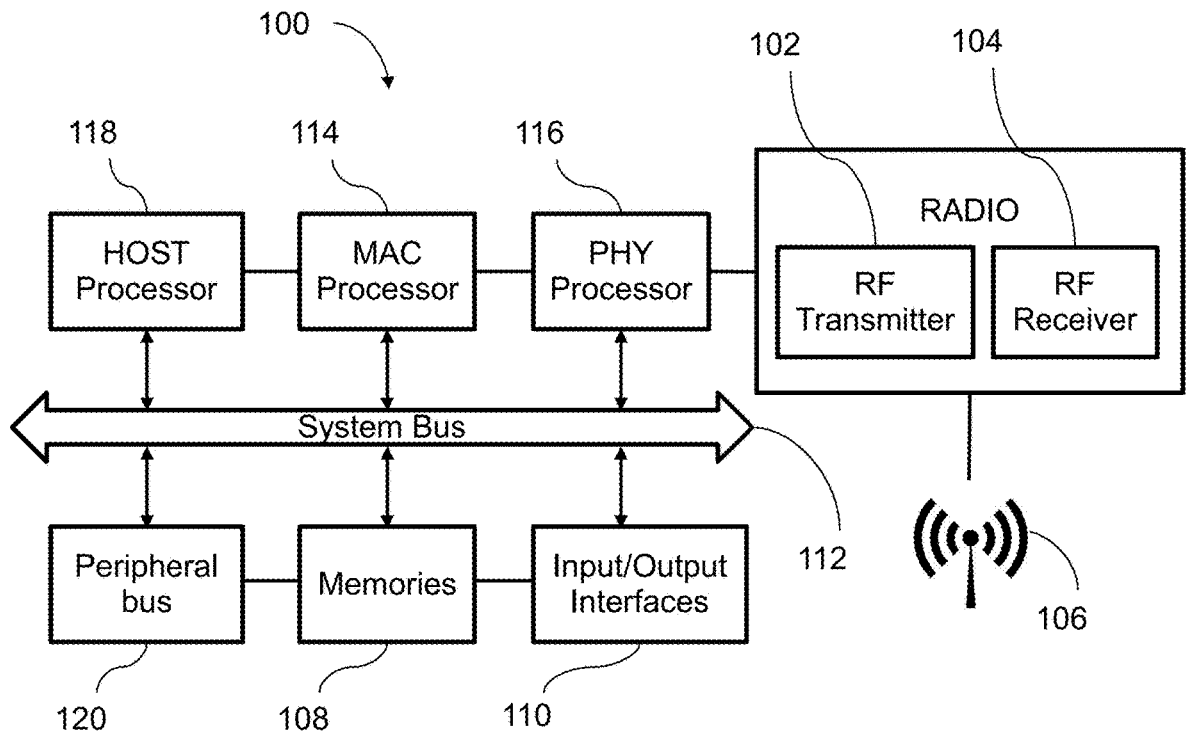
FIG. 1A is an exemplary high-level block diagram of a wireless communication device that can be a station (STA) or Access Point (AP) complying with one or more IEEE 802.11 (Wi-Fi) standards.

General Device Structure for Implementing MIMO Packet Detection FIG. 1A illustrates a high-level block diagram of a wireless communication device 100 that can be implemented in an STA or AP complying with one or more IEEE 802.11 standards and can be used to perform an embodiment of the MIMO packet detection method. In practice, an AP either transmits to the STA or receives from the STA, at different times, using the same frequency band, in a half-duplex mode of operation. The wireless communication device 100 manages a Medium Access Control (MAC) layer and a Physical (PHY) layer complying with one or more IEEE 802.11 standards. In some examples, the wireless communication device is equipped in a mobile device, a wearable device, an extended reality device (e.g., a Virtual Reality (VR) device, an Augmented Reality (AR) device, or a Mixed Reality (MR) device), a personal computer, a laptop computer, a video server, a vehicle, an Internet of Thing (IoT) device, or other devices. The wireless communication device 100 includes a Radio Frequency (RF) transmitter module 102, an RF receiver module 104, an antenna unit 106, one or more memory banks 108, input and output interfaces 110, and a system bus 112. The RF transmitter module 102 and the RF receiver module 104 are also known as a modem (modulator-demodulator), which transmits data by modulating one or more carrier wave signals to encoded digital information, as well as receives data by demodulating the signal to recreate the original digital information. As illustrated, the wireless communication device 100 further includes a MAC processor 114, a PHY processor 116, and a HOST processor 118. These processors can be any type of Integrated Circuit (IC) including a general processing unit, an Application Specific Integrated Circuit (ASIC) or Reduced Instruction Set Computer-five (RISC-V) based ICs, amongst others. Memory banks 108 store software and/or computer-readable instructions, including software (and/or computer-readable instructions) that can be used to implement at least some functions of the MAC layer. Memory bank 108 can include multiple different types of memory with different performance characteristics.

Each processor included in the wireless communication device 100 (e.g., MAC processor 114, PHY processor 116, or HOST processor 118) executes respective software to implement the functions of the respective communication/application layer. Each processor can include a general-purpose processor and a hardware or software services configured to control the processor or a special-purpose processor where software instructions are incorporated into the processor design. The PHY processor 116 includes a transmitting signal processing unit and a receiving signal processing unit (not shown) and is used to manage the interface with the Wireless Medium (WM). The PHY processor 116 operates on Physical layer Protocol Data Units (PPDUs) by exchanging digital samples with the radio module which includes the RF transmitter 102, the RF receiver 104, Analog-to-Digital Converters (ADCs), and digital filters. The MAC processor 114 executes MAC level instructions and manages the interface between the STA application software and the WM, through the PHY processor 116. The MAC processor 114 is responsible for coordinating access to the WM so that the AP and STAs in range can communicate effectively. The MAC processor 114 adds header and tail bytes to units of data provided by the higher levels in the STA and sends them to the PHY layer for transmission. The reverse happens when receiving data from the PHY layer. If a frame is received in error, the MAC processor 114 manages the retransmission of the frame. The HOST processor 118 interfaces with the MAC layer and is responsible for running higher level functionalities of the wireless communication device 100. The peripheral bus 120 connects to several peripherals that support core functions of the wireless communication device 100, including timers, interrupts, radio/filters/system registers, counters, Universal Asynchronous Receiver Transmitter (UART), General Purpose Input/Output (GPIO) interfaces, among others. The memory bank 108 may further store an operating system and applications. In some embodiments, the memory stores recorded information about captured frames and packets. The input/output interfaces 110 allow for exchange of information with a user of the wireless communication device 100. The antenna unit 106 includes multiple antennas that can transmit and receive using Multiple Input Multiple Output (MIMO) techniques.

Figure 1B:
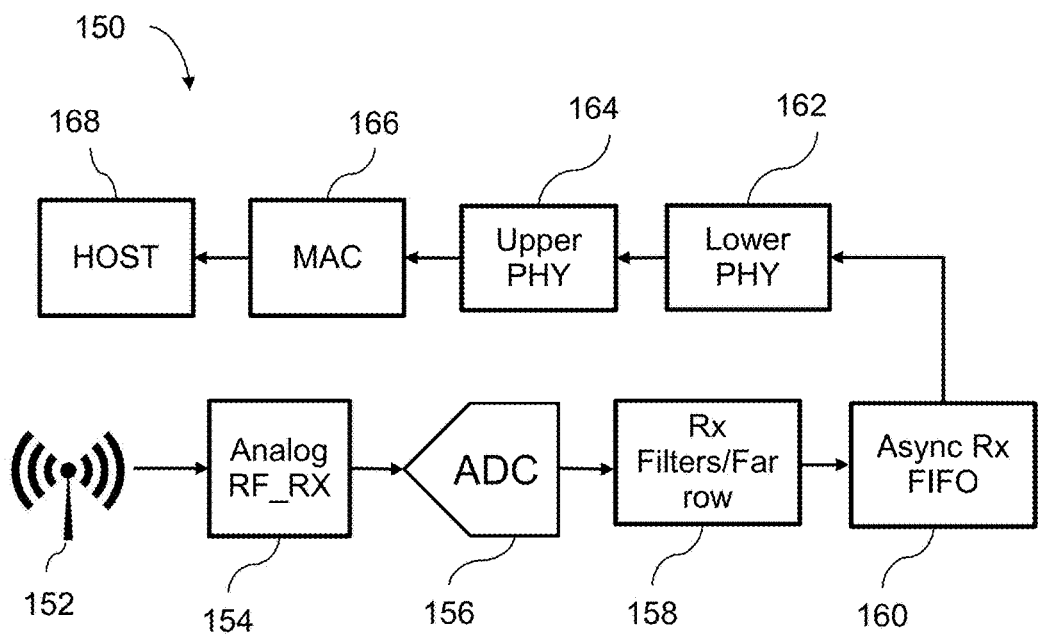
FIG. 1B is a schematic block diagram of a receiver data flow architecture in the wireless communication device of FIG. 1A for receiving wireless signals over a wireless medium.

Receiver Data Flow Architecture for Implementing MIMO Packet Detection FIG. 1B illustrates a schematic block diagram of a receiver data flow architecture 150 that can be used to receive wireless signals carrying frames over the WM. In one illustrative embodiment, the receiver data flow architecture 150 illustrated in FIG. 1B corresponds to or otherwise be associated with the wireless communication device 100 illustrated in FIG. 1A. In some embodiments, wireless signals are received over the WM and transformed into electrical RF signals by a receiving antenna 152. A Radio Frequency (RF) receiver front-end 154 receives an electrical RF signal carrying Wi-Fi frames. The RF receiver front-end 154 may contain a Low Noise Amplifier (LNA), a mixer for down converting the RF signal to an Intermediate Frequency (IF) or baseband signal based on a LO signal, and a Trans-Impedance Amplifier (TIA). An Analog-to-Digital Converter (ADC) 156 coupled to the RF receiver front-end 154 transforms the baseband signal from analog to digital. The output of the ADC 156 is connected to a receiver down-sampling chain 158 (Rx Filters/Farrow), samples are then collected in an asynchronous receiving First In First Out (FIFO) structure 160. These samples in the asynchronous receiving FIFO structure can be accessed by a packet detect module and a sub-band module, both of which may be included in a lower-level PHY module 162. The packet detect module includes hardware and/or implement algorithms that can be used to analyze initial selections of the PHY Protocol Data Unit (PPDU) in the time domain. Based on the analysis, the packet detect module recognizes a received IEEE 802.11 frame and synchronize the frequency and timing of the wireless communication device with the frame being received. The sub-band module within the lower-level PHY module 162 includes hardware and/or implement algorithms that can be used to detect which subchannel in the allocated frequency band is being used for the packet being received. Once a packet is detected and the relevant subchannel is established, samples are forwarded to an upper-level PHY module 164. The upper-level PHY module 164 together with the lower-level PHY module 162 are included in the PHY processor 116 illustrated in FIG. 1A. In some embodiments, the upper-level PHY module 164 can be used to process and decode Orthogonal Frequency Division Multiplexing (OFDM) symbols, with the support of a coprocessor module, to reconstruct a full PPDU. The reconstructed PPDU is output by the upper-level PHY module 164 and subsequently processed by a MAC layer processor 166. MAC layer processor 166 is used to extract the data payload from the PPDU and provide the relevant information to the HOST layer 168 for consumption.

MIMO Packet Detection Algorithm The basic requirement of any packet detection algorithm in a receiver is to distinguish between the signal and noise and trigger subsequent receiver processing if a real signal is successfully detected. As an output of the packet detection algorithm, a Time Offset (TO) value and a Carrier Frequency Offset (CFO) value are fed to the subsequent processing blocks in the receiver. This is the standard approach of a Single Input Single Output (SISO) receiver. In the case of IEEE 802.11ah MIMO transmission, the complexity of an IEEE 802.11ah MIMO receiver is much higher than that of the SISO receiver as it must distinguish between the desired signal and noise as well as distinguish between the desired signal and delayed versions of the desired signal. The delayed versions of the desired signal are Space Time Streams (STS) introduced by the MIMO design, to help the receiver to perform Automatic Gain Control (AGC) effectively on its multiple receiving paths.

There are three packet formats used in IEEE 802.11ah, including Sub-1-GHz short format (S1G_SHORT), Sub-1-GHz long format (S1G_LONG), and Sub-1-GHz 1 MHZ bandwidth format (S1G_1M). The S1G_SHORT packet consists of a 2-symbols long STF, followed by 2-symbols long LTF1, 2-symbols long signal filed (SIG), one or more 1-symbol long LTF, and data field. The S1G_LONG packet consists of an omnidirectional portion and a beam changeable portion, where the omnidirectional portion consists of a 2-symbols long STF, 2-symbols long LTF1, and a 2-symbols long SIG-A, and the beam changeable portion consists of a 1-symbol long D-STF, one or more 1-symbol long D-LTF, 1-symbol long SIG-B, and data field. The S1G_1M packet consists of 4-symbols long STF, 4-symbols long LTF1, 6-symbols long SIG, one or more 1-symbol long LTF2, and data field. The MIMO packet detection algorithm can be applied to all these three formats, however, for case of illustration, the S1G_SHORT format is the packet format used in the following embodiments. The time domain representation of the STF signal at a transmit chain iTX is specified as:

$$r_{STF}^{(itx)}(t) = \frac{1}{\sqrt{N_{STF}^{Tone} N_{STS}}} W_{T_{STF}}(t)$$

$$\sum_{k=-N_{SR}}^{N_{SR}} \sum_{m=1}^{N_{STS}} [Q_k]_{irx,m} [P_{HTLTF}]_{m,l} Y_{k,BW} S_k \exp(j2\pi k \Delta_F (t - T_{CS}(m)));$$

where $T_{CS}(m)$ represents the cyclic shift for the space-time stream m with a preset value, and $Q_k$ represents the spatial mapping coefficients for imparting multiple copies of STF and LTF. For example, the cyclic shift value for S1G_SHORT preamble PPDU is equal to 0 when there is only 1 space-time stream, the cyclic shift values are equal to 0 and −4 when there are 2 space-time streams, are equal to 0, −4, and −2 when there are 3 space-time streams, and are equal to 0, −4, −2, and −6 when there are 4 space-time streams.

Embodiments of a packet detection algorithm for a MIMO receiver adopt a two-tiered approach consisting of two nested loops. An outer loop iterates over all possible combinations of (Rx, STS) pair, where each of these combination pairs indicates the input data received by one receiver on one space-time stream. An inner loop may be similar to the one used in SISO packet detection for processing each (Rx, STS) combination pair. In the inner loop, one or more parallel correlators with STF and LTF kernels are used for peak detection, and accordingly, one or more sets of peaks are detected, and an estimation of [TO, CFO] for each set of peaks detected for this (Rx, STS) combination pair is derived. In one embodiment, final measurements [TO, CFO] are derived from measurements of a best cluster among the (Rx*STS) combination pairs, for example, the final measurements are computed by averaging measurements of the best cluster, based on one or more predefined criteria. In another embodiment, final measurements [TO, CFO] are derived from a score-based method, for example, a score is calculated for each set of peaks and the final measurements are selected based on the scores.

Figure 2:
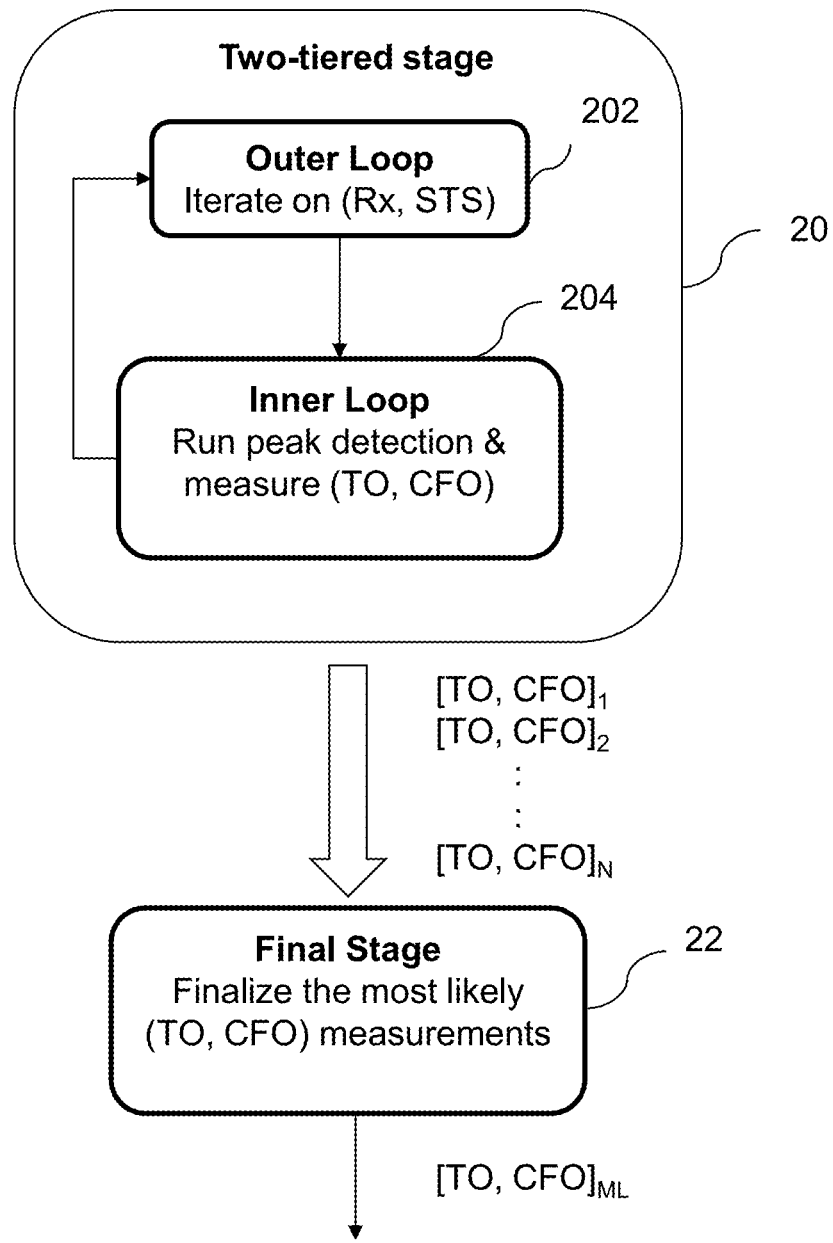
FIG. 2 is a block diagram illustrating a packet detection algorithm for a MIMO receiver according to an embodiment of the present invention.

FIG. 2 is a simple diagram illustrating an embodiment of the two-tiered approach of the MIMO packet detection algorithm. The packet detection algorithm contains a two-tiered stage 20 and a final stage 22, where the two-tiered stage 20 includes an outer loop stage 202 and an inner loop stage 204. The MIMO receiver iterates on (Rx, STS) combination pairs in the outer loop stage for MIMO packet detection. The number of combination pairs for a $N_{tx}*N_{rx}$ MIMO system is limited by M, where M is equal to the product of the number of receiving antennas $N_{rx}$ and the number of space-time stream $N_{STS}$. For example, there are up to 16 combination pairs for a 4×4 MIMO system, up to 6 combination pairs for a 2×3 MIMO system, and up to 4 combination pairs in a 3×2 MIMO system. In the inner loop stage 204, a packet detection algorithm is applied to generate one or more sets of peaks from the input data, for example, each set of peaks is detected by cross correlating the input data associated with a combination pair with one or more correlators. Each set of peaks can be referred to as a candidate in the packet detection algorithm, and the number of candidates N generated from the two-tiered stage 20 is an integer greater than 1. For example, only one candidate for each combination pair with a valid detection result is generated, in another example, one or more candidates for each combination pair with a valid detection result can be generated. In cases when a combination pair fails to generate a valid detection result in the inner loop, it will not generate any candidate associated with this combination pair. Corresponding [TO, CFO] measurements are derived for each candidate in the inner loop 204. After performing packet detection in the outer loop stage 202 and inner loop stage 204 for all (Rx, STS) combination pairs, N candidates and corresponding N sets of [TO, CFO] measurements are output from the two-tiered stage 20, and most likely [TO, CFO] measurements are determined by the final stage 22. The TO measurement represents a start of the packet in the time domain, and the CFO measurement represents the carrier frequency offset caused by the difference between the Local Oscillator (LO) of the transmitter and the LO of the receiver. For example, the CFO measurement is an estimate of a frequency difference between an oscillator signal for down-conversion in the receiver and a carrier signal contained in the received signal. In the final stage 22, most likely [TO, CFO] measurements are determined from cluster selection according to some embodiments, in some other embodiments, most likely [TO, CFO] measurements are determined according to a score-based method. The packet detection algorithm for the MIMO receiver exploits redundancy across a multiplicity of (Rx, STS) combinations and provides robustness in detecting packets even in the worst-case multipath scenarios and across a wide dynamic range of Signal to Noise Ratios (SNRs).

Embodiments of the MIMO packet detection algorithm adopting the two-tiered approach perform better than a single run of packet detection followed by computing square-and-combine correlator outputs across all receiver paths because packet detection is done blindly without any knowledge of the channel response. The optimal combining weights are unknown at the time of packet detection. Furthermore, spatial mapping will give different correlation powers for each (Rx, STS) combination pair.

Figure 3:
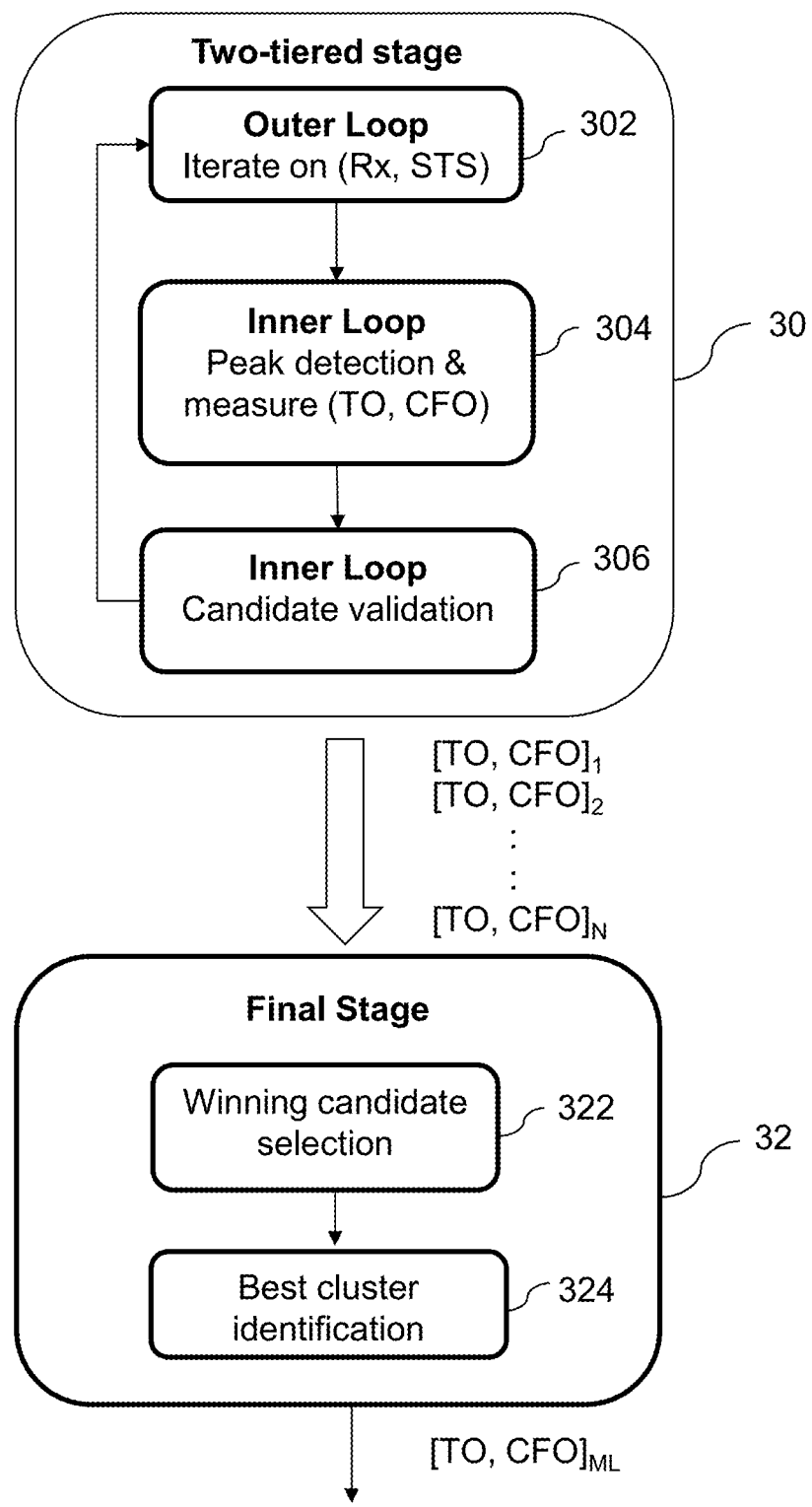
FIG. 3 is a block diagram illustrating a packet detection algorithm for a MIMO receiver according to another embodiment of the present invention.

FIG. 3 is a flowchart illustrating a two-tiered stage 30 and a final stage 32 of a MIMO packet detection algorithm according to some embodiments of the present invention. In the two-tiered stage 30, an outer loop 302 iterates on (Rx, STS) combination pairs, and an inner loop includes a peak detection step 304 and a candidate validation step 306. The final stage 30 includes a winning candidate selection step 322 and a best cluster identification step 324. The two-tiered stage 30 outputs multiple candidates and corresponding [TO, CFO] measurements to the final stage 32. In the peak detection step 304, peaks are correlator outputs exceeding a particular threshold according to an embodiment, for example, the correlators corresponding to kernels used to detect STF, LTF, or both STF and LTF. The candidate validation step 306 is applied to increase the robustness of packet detection in the two-tiered stage 20. In the candidate validation step 306, all the candidates are checked before output to the final stage 32, in an embodiment, each valid candidate is a set of peaks satisfying expected inter-peak distances and an expected count. In another embodiment, the candidate validation step 306 retains candidates that pass a basic check to ensure the TO and CFO measurements of different correlators are matched. In yet another embodiment, the candidate validation step 306 checks inter-peak distances, expected count, as well as TO and CFO measurements consistency for each candidate. Since any invalid candidate is removed by the candidate validation step 306, the winning candidate selection step 322 only calculates scores for the valid candidates. In the winning candidate selection step 322, a score is calculated for each candidate output from the two-tiered stage 30 and the candidate with the highest score is selected as a winning candidate. In some embodiments, the score is derived from one or a combination of predefined metrics related to the output samples of the correlators. In one embodiment, one winning candidate is selected for each (Rx, STS) combination pair with a valid detection result, in another embodiment, one or more candidates can be selected for each (Rx, STS) combination pair with at least one valid detection result. In cases when there is more than one and up to (Rx*STS) winning candidates, the packet detection algorithm proceeds to identify the best cluster in the best cluster identification step 324, otherwise, it declares failure and bails out. The best cluster is a set of winning candidates that satisfy the criterion detailed in the later descriptions. The following paragraphs provide detailed descriptions of various embodiments for implementing some of the above-mentioned packet detection steps.

Peak Detection Step A wireless communication device continuously searches for the unique waveform carried in the preamble of a frame when it is not either receiving, transmitting, or sleeping. Embodiments of the present invention run peak detection in two nested loops as shown in FIG. 2 and FIG. 3, where an outer loop iterates over all possible combinations of (Rx, STS) combination pairs, and an inner loop detects peaks in correlator outputs and determines corresponding candidates for these (Rx, STS) combination pairs. An embodiment of a correlator used in packet detection is a kernel cross-correlator. An exemplary STF kernel used for packet detection for a STF according to the IEEE 802.11ah standard is 8 microseconds (us) long whereas an exemplary LTF kernel is 16 microseconds (us) long, both sampled at the operating frequency, and quantized to Q bit for optimal scaling. Q may be set to as low as 1 according to some embodiments. An additional 32 microseconds (us)

long LTF kernel may also be used according to some embodiments of the present invention to improve the reliability of the final packet detection result. The STF and LTF kernels are used for cross correlating with the input In-phase/Quadrature (I/Q) data. The input I/Q data are digital baseband samples generated from an ADC in the receiver of the wireless communication device. The peak detection step detects the start of a frame for each combination pair by looking for correlating energy peaks after cross correlating the input I/Q data with the STF and LTF kernels. Once an initial set of peaks corresponding to the STF is obtained, LTF detection is performed in a similar way starting from the last STF peak index to detect correlation peaks for LTF. The STF or LTF kernel is derive from a pre-computed signal of a certain length, corresponding to a particular configuration determined by Bandwidth (BW) parameters including Channel Bandwidth (CBW), Operating Bandwidth (OBW), SubChannel Number and Duplicate mode, and quantized to a certain number of bins for efficient hardware implementation. In the peak detection step, corresponding TO and CFO measurements are estimated for each set of peaks.

Figure 4:
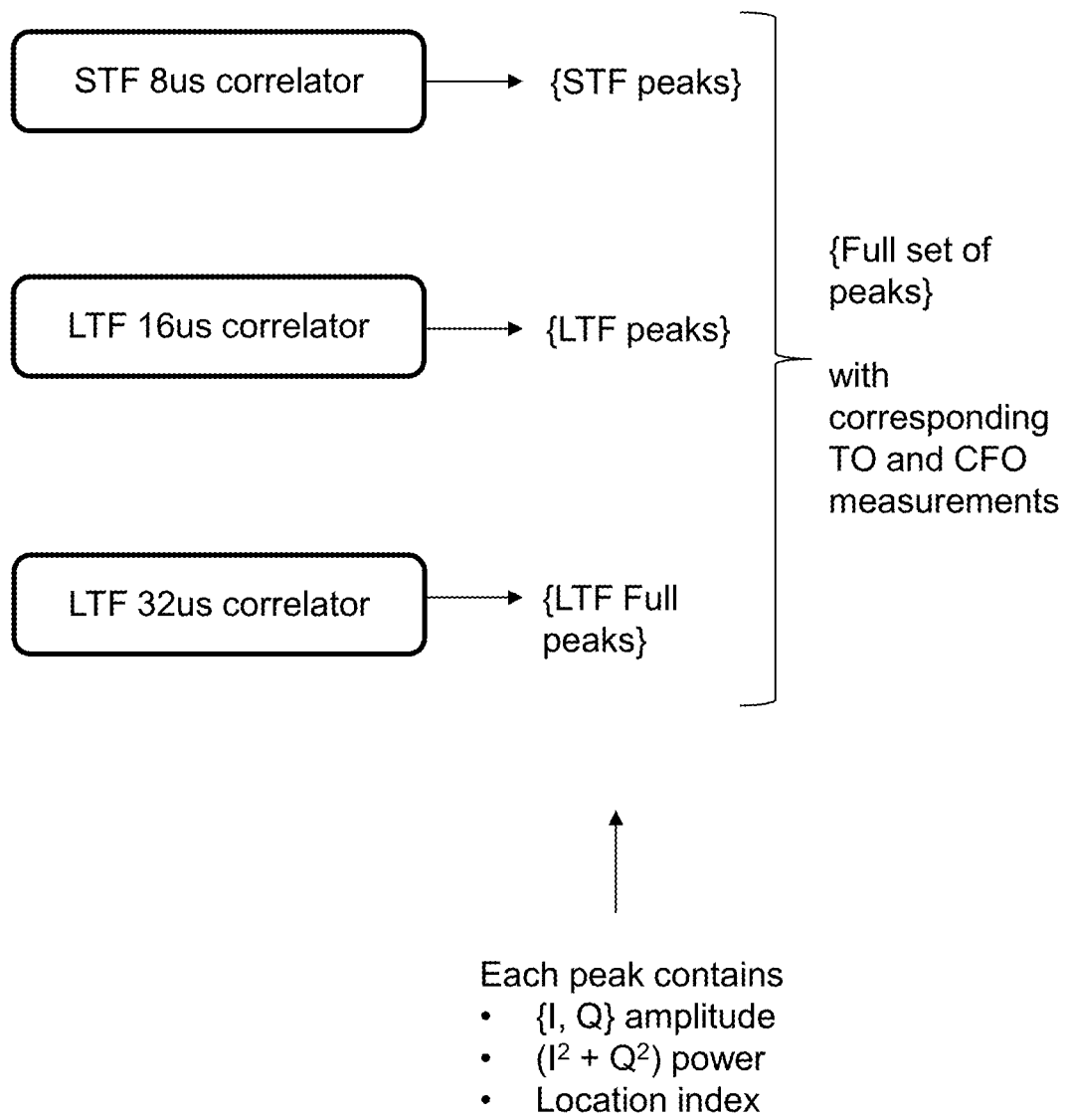
FIG. 4 illustrates a candidate including correlation peaks of three correlators for a given combination pair according to an embodiment of the present invention.

Some embodiments of the peak detection step for each combination pair include deciding between two hypotheses at the output of the cross-correlators. For example, the cross-correlators include an 8 us STF kernel, a 16 us LTF kernel, and a 32 us LTF kernel. A hypothesis is also referred to as a candidate in the description and these two terms can be used interchangeably in the description. Hypothesis 1 assumes the input window is aligned, either exactly aligned or having closest alignment, to the STF or LTF start. Hypothesis 2 assumes the input window is not aligned, either partially aligned or not aligned at all, to the STF or LTF start. In hypothesis 1, the system is modeled as a sum of the power of the cross-correlator output with the correlation window aligned to the desired signal Cross Correlation Function Power (CCFP) and a noise. For example, the noise is an estimate of the Additive White Gaussian Noise (AWGN) power at the cross-correlator output. In hypothesis 2, the system is modeled as a sum of the power of any secondary peak arising from a spatial pattern match (CCF_spurious) and the noise. The basic idea of the packet detection strategy is to have a metric representing the correlator output power that will have two distinct Probability Density Functions (PDFs) for the above hypotheses and then make a decision by comparing the metric to a certain threshold that gives the desired trade-off between probability of detection ($P_d$) and probability of false alarm ($P_{fa}$). In one embodiment, at the start of packet detection for each combination pair, the CCFP of the correlator outputs is compared to a first threshold, for example, the first threshold corresponds to a predefined multiple of the noise. In one embodiment, the first threshold is chosen to be a low number, for example, 4 dB, above the noise to increase the probability of detection. The noise estimate may be derived from filtering CCFP. Subsequently, a higher second threshold is set to reduce the probability of triggering on a false peak according to an embodiment. For example, the second threshold may be a predefined multiple K (e.g. 0<K<1) of the previous maximum peak detected using the first threshold. An initial set of peaks corresponding to a combination pair that crosses the second threshold can be stored. FIG. 4 illustrates a candidate including correlation peaks detected from three correlators for a given (Rx, STS) combination pair according to an embodiment of the present invention. In this embodiment, a candidate, also referred to as a full set of peaks, of a combination pair contains STF peaks, LTF peaks, and LTF full peaks. Each set of STF peaks, LTF peaks, and LTF full peaks of a candidate has its own [TO, CFO] measurements. The STF peaks are peaks of correlation outputs generated by cross correlating the input I/Q data with an STF 8 us correlator, the LTF peaks are peaks of correlation outputs generated by cross correlating the input I/Q data with an LTF 16 us correlator, and the LTF full peaks are peaks of correlation outputs generated by cross correlating the input I/Q data with an LTF 32 us correlator. Each correlator realizes a Cross Correlation Function (CCF) with an input connected to a baseband IQ stream of a given (Rx, STS) combination pair and output a set of correlation peaks. Information related to each peak can be stored, for example, {I, Q} amplitude, ($I^2+Q^2$) power, and location index corresponding to each peak are stored. The ($I^2+Q^2$) power is also referred to as a Cross Correlation Function Power (CCFP). In some other embodiments, one, two, or more than three correlators may be used for peak detection to generate candidates each including a full set of correlation peaks and corresponding TO and CFO measurements.

Candidate Validation Step One or more of the candidates generated from the peak detection step may be directly used to derive the final detection result in some embodiments of the present invention. In some other embodiments, a candidate validation step is further executed to check the validity of each candidate generated from the peak detection step. In the candidate validation step, each initial set of peaks of a candidate detected in the peak detection step may be shortlisted into a subset of peaks or the candidate may be removed according to one or more criteria. The correlation peaks are supposed to space at an expected distance from one another for a given configuration of {preamble, channel bandwidth and operating bandwidth}. For example, a distance criterion ensures that the distances between peaks are 8 microseconds for STF and 32 microseconds for LTF. The initial set of peaks may be shortlisted into a subset of peaks by removing peaks not satisfying the distance criterion. Another criterion is related to a number of peaks detected by each correlator, for example, the expected count of peaks detected from a STF correlator is 20 when the bandwidth is 1 MHZ, and the expected count of peak detected from a STF correlator is 10 when then bandwidth is 2, 4, or 8 MHz. The number of peaks detected from each correlator in a candidate is compared with an expected count, and the initial set of peaks may be shortlisted or the corresponding candidate is entirely removed when the number of peaks does not match the expected count. In some embodiments, a basic check for measurement alignment is applied to validate the candidates output from the peak detection step. An estimation of [TO, CFO] for STF correlation peaks and an estimation of [TO, CFO] for LTF correlation peaks are derived for each candidate after detecting these correlation peaks in the peak detection step. The basic check compares one or both of the [TO, CFO] measurements associated with different correlators in each candidate, and the candidate is validated only if the measurements of these correlators agree reasonably well, for example, the candidate is validated when the CFO discrepancy between the STF and LTF peaks is less than a predefined threshold. For example, the basic check compares the TO measurements between the STF detection and LTF detection, in another example, the basic check compares the CFO measurements between the STF detection and LTF detection, and in yet another example, both the TO and CFO measurements between the STF detection and LTF detection are compared. Any candidate having mismatched TO measurements or mismatched CFO measurements can be removed according to these embodiments. Each candidate containing a full set of peaks is checked in the candidate validation step and the ones satisfying the predetermined criteria are valid candidates.

Winning Candidate Selection Step After deriving multiple candidates and their corresponding [TO, CFO] measurements for all the combination pairs, one or more winning candidates are selected among the candidates. The winning candidate may be selected based on a score-based method, which in turn is derived from multiple metrics or multiple dimensions. In the winning candidate selection step, a score for each candidate is computed by a weighted combination of metrics related to outputs of the correlators. For example, a score for a given candidate can be computed based on one or a combination of the following metrics:

1. Mean of CCFP corresponding to the peaks generated from the LTF 32 us correlator;
2. Maximum of CCFP corresponding to the peaks generated from the LTF 16 us correlator;
3. Maximum of CCFP corresponding to the peaks generated from the STF 8 us correlator;
4. Variation of CCFP corresponding to the peaks generated from the LTF 16 us correlator;
5. Variation of CCFP corresponding to the peaks generated from the STF 8 us correlator;
6. Discrepancy in CFO measurements of last two LTF 16 us peaks; and
7. Discrepancy in CFO measurements between the LTF 16 us and STF 8 us peaks.

These are some exemplary metrics derived from the information related to the peaks generated from the correlators, other metrics derived from the information related to the peaks including but not limited to the {I, Q} amplitude, CCFP, and location index can also be used for score computing.

The variation of CCFP may be computed by subtracting a minimum CCFP from a maximum CCFP. In the above example, it is desirable to maximize the first three metrics and minimize the last four metrics. In some embodiments, the scoring system for determining the best candidate computes a score for each combination pair by combining the metrics using a weighted summation. In an embodiment of computing a score for each of the M candidates, a weighted sum of the 7 metrics is computed for each candidate. An example of the metric weights for the 7 metrics is [1 1 2 −2 −2 −2 −2]', where a positive weight implies that the associated metric is desirable and needs to be maximized, whereas a negative weight implies that the associated metric is undesirable and needs to be minimized. The metric weights are determined empirically, for example, by running various configurations of sub-bands and MIMO modes. The score for each candidate n is calculated as:

score $(n)=\Sigma(\text{metric})_i*(\text{weight})_i$ for $i=1{:}7$; where $n$ is in the range of 1 to $M$.

Some other embodiments of the score-based method also consider one or more other metrics related to, and not limited to, the amplitude or power of the correlation peaks, TO measurements, and CFO measurements. For example, the metrics related to mean of CCFP corresponding to the peaks generated from the STF 8 us correlator, mean of CCFP corresponding to the peaks generated from the LTF 16 us correlator, maximum of CCFP corresponding to peaks generated from the LTF 32 us correlator, variation of CCFP corresponding to the peak generated from the LTF 32 us correlator, discrepancy in CFO measurements between the LTF 32 us and STF 8 us peaks, discrepancy in TO measurements between the LTF 16 us and STF 8 us peaks, and discrepancy in TO measurements between the LTF 32 us and STF 8 us peaks.

Best Cluster Identification Step In some embodiments, multiple candidates generated from the two-tiered stage are further processed by a best cluster selection algorithm. In some other embodiments, multiple winning candidates generated from the winning candidate selection step are further processed by the best cluster selection algorithm. The TO value of each candidate or winning candidate is the sample index or location index of its first STF 8 us peak as it is the best estimate of the start of the packet. The CFO value is an average of the CFO measurements derived from the STF 16 us peaks, LTF 8 us peaks, and LTF 16 us peak of the candidate or winning candidate. In one embodiment, the best cluster of TO values is selected, and a final TO value is derived from those candidates/winning candidates within the best cluster of TO values. For example, the final TO value is derived by averaging those TO values in the best cluster, which could be a mean value or a medium value among the TO values in the best cluster. The final CFO value is derived from CFO values corresponding to the best TO cluster. In another embodiment, the best cluster of CFO values is selected, and a final CFO value is derived from those candidate/winning candidates within the best cluster of CFO values. The final CFO value is derived by averaging those CFO values in the best CFO cluster and the final TO value is derived from corresponding TO values of the best CFO cluster.

In some embodiment of the best cluster selection algorithm, [TO, CFO] measurements of the winning candidates across all (Rx, STS) combination pairs are collected. Each cluster of TO values is characterized by a bin of a particular size in which the TO values are contained. For example, the TO values of the [TO, CFO] measurements are clustered with spaces of {0, 4, 2, 6} us apart from one another, as expected from the cyclic-shift diversity values defined in the IEEE 802.11ah standard. The final decision of the best cluster may be derived based on one or more criteria. For example, the first criterion is to choose a cluster that has the maximum number of winning candidates. The second criterion is to choose the cluster that has a maximum cumulative score of all winning candidates in the cluster. For example, once the best TO cluster is decided, a TO value is derived from the best TO cluster as the final TO value of the MIMO packet detection algorithm. For example, an average, a mean, or a median value of all TO values within the best cluster is computed as the final TO value. A final CFO value can be derived from the CFO values corresponding to the best TO cluster.

Figure 5A:
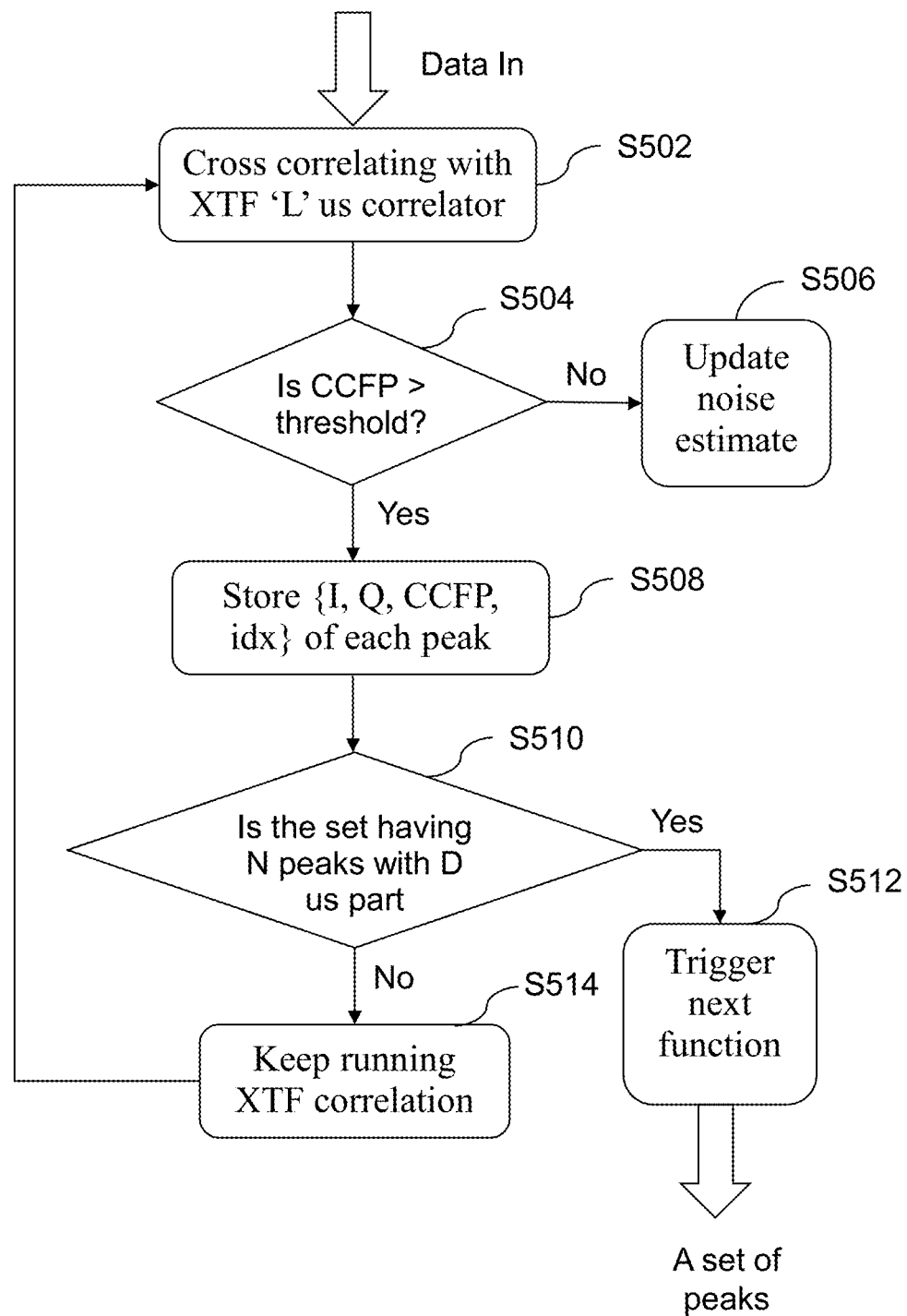
FIG. 5A is a flowchart of processing input data with a generic correlator in the MIMO packet detection algorithm according to an embodiment of the present invention.
Figures 5B, 5C:
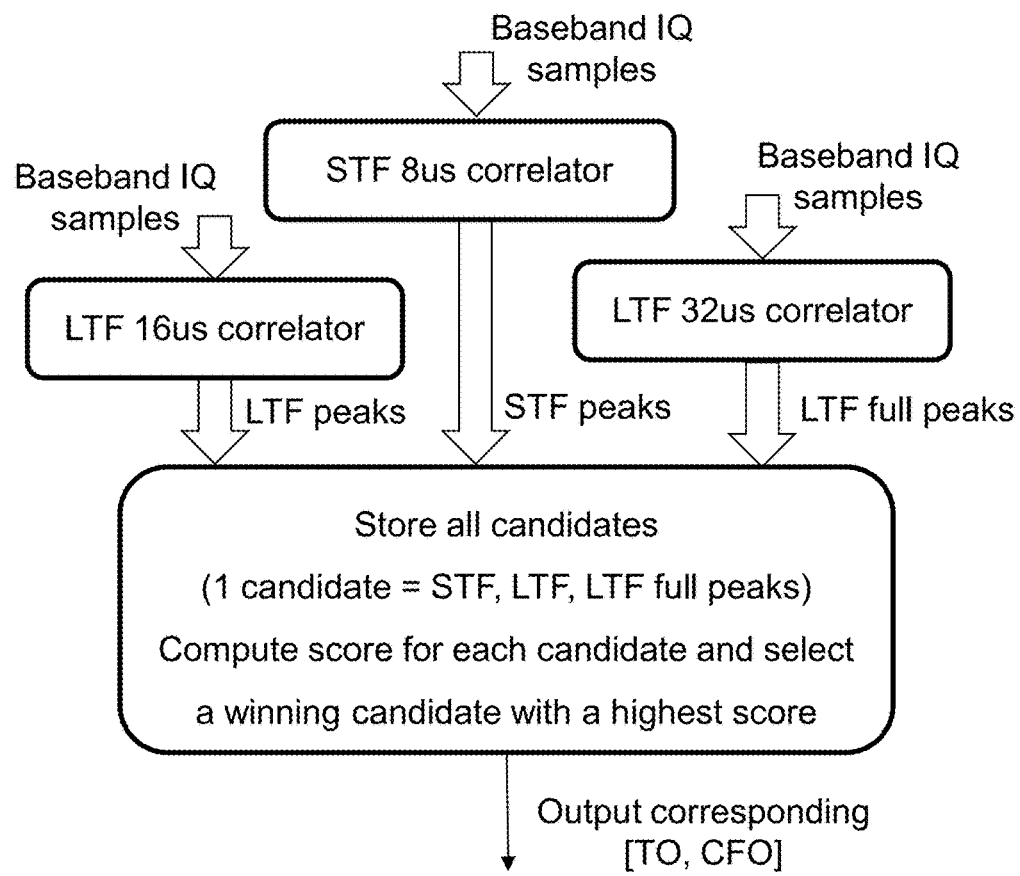
FIG. 5B is a table showing exemplary parameters corresponding to each of the correlators used in the MIMO packet detection algorithm.
FIG. 5C is a flowchart illustrating the logical data flow of the MIMO packet detection algorithm employing three correlators for deriving measurements from detected peaks of candidates according to one embodiment of the present invention.

Exemplary Embodiment FIGS. 5A-5C illustrate flowcharts and associated correlator parameters of the MIMO packet detection algorithm for receiving an IEEE 802.11ah according to an exemplary embodiment of the present invention. The flowchart in FIG. 5A describes a logical data flow of processing input data with a generic XTF correlator for a given Bandwidth (BW) and MIMO mode. In this embodiment, an XTF correlator is either an STF correlator, an LTF1 correlator, or an LTF2 correlator, where the STF correlator corresponds to an STF correlator with a kernel length L equal to 8 us, the LTF1 correlator corresponds to an LTF correlator with a kernel length L equal to 16 us, and the LTF2 correlator corresponds to an LTF correlator with a kernel length L equal to 32 us. FIG. 5B is a table showing the parameters corresponding to each of the XTF correlators for the MIMO packet detection algorithm. In step S502 of FIG. 5A, upon the arrival of input data, the generic XTF correlator starts cross correlating the input data with a corresponding 'L' us kernel. A threshold is set for peak detection in step S504, and if there is no Cross Correlation Function Power (CCFP) found to be greater than the threshold, the noise estimate is updated in step S506. For example, the CCFP is calculated by a sum of the square of the I amplitude and the square of the Q amplitude ($I^2+Q^2$). In cases when there is a CCFP greater than the threshold, it is detected as a peak, and corresponding information including the I amplitude, Q amplitude, CCFP, and location index (idx) of the peak are stored in a memory, buffer, or register in step S508. In step S510, this peak detection for the XTF correlator is continued until a set of N peaks with an expected distance D us apart is detected. As shown in the correlator parameter table of FIG. 5B, the expected number of peaks N depends on the channel bandwidth (BW) and the correlator. For example, N is equal to 10, 3, and 2 for the STF, LTF1, and LTF2 correlators respectively when the BW is greater than 1 MHZ, whereas N is equal to 20, 5, and 4 for the STF, LTF1, and LTF2 correlators respectively when the BW is equal to 1 MHz. The expected distance D for the STF correlator is 10 us and the expected distance D for both the LTF correlators is 32 us. A set of peaks for the XTF correlator is generated and a subsequent function can be triggered in step S512 when a set of N peaks with D us apart for the XTF correlator is successfully detected. If the number of detected peaks in the set or the distance between consecutive peaks do not match the expected N and D respectively, the MIMO packet detection algorithm keeps running XTF correlation with the input data in step S514 and repeats the packet detection steps from step S502.

FIG. 5C shows the logical data flow of the MIMO packet detection algorithm employing three correlators for deriving measurements from detected peaks of candidates according to one embodiment of the present invention. An exemplary data flow within each of the STF 8 us correlator, LTF 16 us correlator, and LTF 32 us correlator is described in the flowchart shown in FIG. 5A. For example, each of the correlators receives input data such as Baseband (BB) In-phase and Quadrature (I/Q) samples, detects peaks, checks the validity of the peaks, then outputs one or more sets of peaks for each combination pair. Each candidate associated with a given combination pair contains a full set of STF peaks, LTF peaks, and LTF full peaks detected by the three correlators. In one embodiment, up to M candidates detected by the correlators within a sliding window of a duration greater than a sum of the STF and LTF periods are buffered, and a score is computed for each of the buffered candidates. M represents the number of available combination pairs of the MIMO system. A score is computed for each candidate and a winning candidate is selected based on the scores. If there is only one winning candidate with the highest score, [TO, CFO] measurements of the winning candidate are determined and output as the final packet detection result of the MIMO packet detection algorithm. In another embodiment, up to one winning candidate is selected for each combination pair, [TO, CFO] measurements of these winning candidates across all (Rx, STS) combination pairs are collected and these measurements are clustered. The final TO value and final CFO value may be derived from a best cluster.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims. Well-known circuits, processes, algorithms, structures, and techniques may be shown without unnecessary detail to avoid obscuring the aspects.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks may be stored in a computer-readable or machine-readable medium. The computer-readable medium may comprise memory or data storage media, such as Random-Access Memory (RAM) such as Synchronous Dynamic Random-Access Memory (SDRAM), Read-Only Memory (ROM), Non-Volatile Random-Access Memory (NVRAM), Electrically Erasable Programmable Read-Only Memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves. The program code may be executed by a processor, which may include one or more processors, such as one or more Digital Signal Processors (DSPs), general purpose microprocessors, an Application Specific Integrated Circuits (ASICs), Field Programmable Logic Arrays (FPGAs), or other equivalent integrated or discrete logic circuitry. Such a processor may be configured to perform any of the steps described in this disclosure. A general-purpose processor may be a microprocessor; alternatively, the processor may be any conventional processor, controller, microcontroller, or state machine. A processor may also be implemented as a combination of computing devices.

To clearly illustrate the interchangeability of hardware and software, various illustrative components, blocks, modules, engines, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present application.

What is claimed is:

1. A method of packet detection for a Multiple Input Multiple Output (MIMO) system, the method comprising the steps of:

receiving input data by a receiver of the MIMO system, the MIMO system comprising a number of transmitting antennas $N_{tx}$ and a number of receiving antennas $N_{rx}$, wherein the number of transmitting antennas $N_{tx}$ and the number of receiving antennas $N_{rx}$ are integers greater than or equal to 1;

wherein Rx is one of the receiving antennas and STS is one of a plurality of space-time streams received by the receiver, the MIMO system thereby defining a plurality of (Rx, STS) combination pairs, each (Rx, STS) combination pair comprising one of the receiving antennas and one of the plurality of space-time streams;

performing peak detection by a two-tiered approach including an outer loop and an inner loop to generate a plurality of candidates, wherein the outer loop iterates over the plurality of (Rx, STS) combination pairs, and the inner loop runs peak detection on the input data by one or more correlators for each of the (Rx, STS) combination pairs, and wherein each of the plurality of candidates is composed of detected peaks from correlation outputs corresponding to a respective one of the (Rx, STS) combination pairs; and deriving a final start of packet (TO) measurement and a final Carrier Frequency Offset (CFO) measurement from the plurality of candidates as a final packet detection result.

2. The method of claim 1, wherein a number of space-time stream $N_{STS}$ received by the receiver is limited by a minimum value of the number of transmitting antennas $N_{tx}$ and the number of receiving antennas $N_{rx}$, and wherein a number of the plurality of (Rx, STS) combination pairs is limited by a product of the number of receiving antennas $N_{rx}$ and the number of space-time streams $N_{STS}$.

3. The method of claim 1, wherein:
the inner loop runs Short Training Field (STF) detection followed by Long Training Field (LTF) detection;
the STF detection comprises performing cross-correlation on the input data with at least one STF correlator of the one or more correlators;
the LTF detection comprises performing cross-correlation on the input data with at least one LTF correlator of the one or more correlators; and
the at least one STF correlator or the at least one LTF correlator is derived from a pre-computed signal of a certain length, corresponding to a particular configuration determined by Bandwidth (BW) parameters.

4. The method of claim 3, wherein:
the at least one STF correlator has a kernel length of 8 microseconds;
the at least one LTF correlator includes a first LTF correlator having a kernel length of 16 microseconds; and
the at least one LTF correlator includes a second LTF correlator having a kernel length of 32 microseconds.

5. The method of claim 3, wherein the inner loop runs peak detection for a particular (Rx, STS) combination pair of the plurality of (Rx, STS) combination pairs based on:
deciding between two hypotheses to thereby determine a decided hypothesis, wherein a first hypothesis of the two hypotheses corresponds to an input window aligning with an STF or LTF start, and wherein a second hypothesis of the two hypotheses corresponds to the input window not aligning with the STF or LTF start;
determining a model for the MIMO system based on the decided hypothesis;
determining a metric representing a correlator output power that has a distinct Probability Density Function (PDF) corresponding to the decided hypothesis;
making peak decisions by comparing the metric to a threshold;
storing one or more peaks corresponding to the peak decisions; and
determining a full set of peaks from the one or more stored peaks as a candidate included in the plurality of candidates and corresponding to the particular (Rx, STS) combination pair.

6. The method of claim 1, wherein the inner loop runs peak detection according to a first threshold at a start of the packet detection, then the inner loop runs peak detection according to a second threshold higher than the first threshold to reduce false peak detection.

7. The method of claim 6, wherein the first threshold corresponds to a predefined multiple of an Additive White Gaussian Noise (AWGN), and the second threshold corresponds to a predefined multiple of a previous maximum peak detected using the first threshold.

8. The method of claim 1, further comprising validating the plurality of candidates by checking each candidate of the plurality of candidates with a criterion, and shortlisting or removing one or more candidates of the plurality of candidates for which the criterion is not satisfied.

9. The method of claim 8, wherein the criterion is satisfied for a particular candidate of the plurality of candidates when a number of detected peaks in the particular candidate matches an expected count.

10. The method of claim 8, wherein the criterion is satisfied for a particular candidate of the plurality of candidates when the detected peaks in the particular candidate are spaced at an expected inter-peak distance from one another.

11. The method of claim 8, further comprising deriving TO measurements and CFO measurements for Short Training Field (STF) detection and Long Training Field (LTF) detection, and wherein the criterion is satisfied when the TO measurements between the STF detection and the LTF detection are matched and the CFO measurements between the STF detection and the LTF detection are matched.

12. The method of claim 1, wherein performing the peak detection includes generating one or more candidates for each (Rx, STS) combination pair of the plurality of (Rx, STS) combination pairs with a valid detection result, and not generating any candidate for each (Rx, STS) combination pair of the plurality of (Rx, STS) combination pairs without a valid detection result.

13. The method of claim 1, wherein the step of deriving the final TO measurement and the final CFO measurement further comprises:
computing a score for each candidate of the plurality of candidates, wherein the score for each candidate is derived from information related to the detected peaks of the candidate; and
selecting one or more winning candidates from the plurality of candidates according to the scores, wherein the final TO measurement and the final CFO measurement are derived from the one or more winning candidates.

14. The method of claim 13, wherein:
the information related to the detected peaks of each candidate includes Inphase (I) and Quadrature (Q) amplitudes, a Cross Correlation Function Power (CCFP), and a location index; and
the score for each candidate is derived from one or more metrics or dimensions associated with the information related to the detected peaks of the candidate.

15. The method of claim 14, wherein:
the one or more metrics comprise one or a combination of: a mean CCFP of the one or more correlators, a maximum CCFP of the one or more correlators, a variation of CCFP of the one or more correlators, a discrepancy in CFO measurements between last two of the detected peaks from the correlation outputs, and a discrepancy in CFO measurements between detected peaks of two correlators included in the one or more correlators, wherein the variation of CCFP is computed by subtracting a minimum CCFP from a maximum CCFP.

16. The method of claim 14, wherein each metric of the one or more metrics has a corresponding metric weighting, and wherein the score for each candidate is computed according to a sum of weighted metrics corresponding to the one or more metrics weighted by the corresponding metric weighting.

17. The method of claim 1, wherein the step of deriving the final TO measurement and the final CFO measurement further comprises:
computing TO measurements and CFO measurements for the plurality of candidates;
clustering the TO measurements for the plurality of candidates with predefined spaces from one another to thereby obtain one or more TO clusters each including at least one TO measurement of the TO measurements; and
selecting a TO cluster from the one or more TO clusters and corresponding CFO measurements for deriving the final TO measurement and the final CFO measurement.

18. The method of claim 17, wherein the TO cluster is selected based on one or more criteria including selecting a particular TO cluster from the one or more TO clusters based on the particular TO cluster having a maximum number of TO measurements, or selecting a particular TO cluster from the one or more TO clusters based on the particular TO cluster having a maximum cumulative score corresponding to TO measurements included in the particular TO cluster.

19. The method of claim 17, wherein the final TO measurement is computed by averaging TO measurements within the selected TO cluster, and wherein the final CFO measurement is computed by averaging the corresponding CFO measurements.

20. A wireless communication device for receiving wireless signals by a Multiple Input Multiple Output (MIMO) system, comprising:
a receiver of the MIMO system, the MIMO system comprising a number of transmitting antennas $N_{tx}$ and a number of receiving antennas $N_{rx}$, wherein the number of transmitting antennas $N_{tx}$ and the number of receiving antennas $N_{rx}$ are integers greater than or equal to 1;
a processor, communicatively coupled with the receiver; and
one or more memory banks, communicatively coupled to the processor and storing processor readable codes that, when executed by the processor in conjunction with the receiver, is configured for:
receiving input data by the receiver, wherein Rx is one of the receiving antennas and STS is one of a plurality of space-time streams received by the receiver, the MIMO system thereby defining a plurality of (Rx, STS) combination pairs, each (Rx, STS) combination pair comprising one of the receiving antennas and one of the plurality of space-time streams;
performing peak detection by a two-tiered approach including an outer loop and an inner loop to generate a plurality of candidates, wherein the outer loop iterates over the plurality of (Rx, STS) combination pairs, and the inner loop runs peak detection on the input data by one or more correlators for each of the (Rx, STS) combination pairs, and wherein each of the plurality of candidates is composed of detected peaks from correlation outputs corresponding to a respective one of the (Rx, STS) combination pairs; and
deriving a final start of packet (TO) measurement and a final Carrier Frequency Offset (CFO) measurement from the plurality of candidates as a final packet detection result.

* * * * *